US005397493A

United States Patent [19]

Potocki

[11] Patent Number: 5,397,493

[45] Date of Patent: Mar. 14, 1995

[54] PROCESS FOR MAKING CONCENTRATED HEAVY DUTY DETERGENTS

[75] Inventor: James Potocki, North Bergen, N.J.

[73] Assignee: Lever Brothers Company, Division of Conopco, Inc., New York, N.Y.

[21] Appl. No.: 87,587

[22] Filed: Jul. 6, 1993

[51] Int. Cl.$^6$ .................... C11D 17/08; C11D 7/06; C09K 11/06

[52] U.S. Cl. .................... 252/89.1; 252/156; 252/173; 252/301.21; 252/DIG. 14

[58] Field of Search .................. 252/89.1, 90, 91, 173, 252/135, 156, 174.21, 549, DIG. 14, 301.21

[56] References Cited

U.S. PATENT DOCUMENTS 4,314,820 2/1982 Weber et al. .................... 252/89.1

5,174,927 12/1992 Honsa .................... 252/524

FOREIGN PATENT DOCUMENTS 9109107 6/1991 WIPO .................... 252/89.1

*Primary Examiner*—Paul Lieberman

*Assistant Examiner*—Lorna M. Douyon

*Attorney, Agent, or Firm*—Ronald A. Koatz

[57] ABSTRACT

The present invention relates to a process for reducing viscosity and improving draining characteristics of a structured lamellar composition by maintaining specific order of addition. More specifically, by adding to a composition a premix comprising F-dye and surfactant before addition of remaining surfactant, the advantages mentioned above are obtained.

5 Claims, 2 Drawing Sheets

PROCESS FOR MAKING CONCENTRATED HEAVY DUTY DETERGENTS

FIELD OF THE INVENTION

The present invention is concerned with so-called structured or duotropic liquid compositions and with processes for making these compositions. In particular, the invention is concerned with methods of improving properties (e.g., lowered viscosity, better cleaning and pouring characteristics) based on process variables (e.g., order of addition).

BACKGROUND OF THE INVENTION

The present invention relates to aqueous liquid detergent compositions which contain sufficient detergent active material and, optionally, sufficiently dissolved electrolyte to result in a structure of lamellar droplets dispersed in a continuous aqueous phase.

Lamellar droplets are a particular class of surfactant structures which, inter alia, are already known from a variety of references, e.g., H. A. Barnes, 'Detergents', Ch. 2 in K. Walters (Ed), 'Rheometry: Industrial Applications', J. Wiley & Sons, Letchworth 1980.

Such lamellar dispersions are used to endow properties such as consumer-preferred flow behaviors and/or turbid appearance. Many are also capable of suspending particulate solids such as detergency builders or abrasive particles. Examples of such structured liquids without suspended solids are given in U.S. Pat. No. 4,244,840 to Straw, whilst examples where solid particles are suspended are disclosed in specifications EP-A-160,342; EP-A-38,101; EP-A-104,452 and also in the aforementioned U.S. Pat. No. 4,244,840. Others are disclosed in European Patent Specification EP-A-151,884, where the lamellar droplet are called 'spherulites'.

The presence of lamellar droplets in a liquid detergent product may be detected by means known to those skilled in the art, for example optical techniques, various rheometrical measurements, X-ray or neutron diffraction, and electron microscopy.

The droplets consist of an onion-like configuration of concentric bi-layers of surfactant molecules, between which is trapped water or electrolyte solution (aqueous phase). Systems in which such droplets are close packed provide a very desirable combination of physical stability and solid suspending properties with useful flow properties.

The viscosity and stability of the product depend on the volume fraction of the liquid which is occupied by the droplets. Generally speaking, the higher the volume fraction of the dispersed lamellar phase (droplets), the better the stability. However, higher volume fractions also lead to increased viscosity which in the limit can result in an unpourable product. This results in a compromise being reached. When the volume fraction is around 0.6, or higher, the droplets are just touching (space-filling). This allows reasonable stability with an acceptable viscosity (say no more than 2.5 Pas, preferably no more than 1 Pas at a shear rate of $21 s^{-1}$). This volume fraction also endows useful solid suspending properties. Conductivity measurements are known to provide a useful way of measuring the volume fraction, when compared with the conductivity of the continuous phase.

FIG. 1 shows a plot of viscosity against lamellar phase volume fraction for a typical composition of known kind:

| | wt. % |
|---|---|
| Surfactants* | 20 |
| Na-formate | 5 or 7.5 |
| Na-citrate 2aq | 10 |
| Borax | 3.5 |
| Tinopal CBS-X | 0.1 |
| Perfume | 0.15 |
| Water | Balance |

*For example, a system comprising Na-dodecyl benzene sulfonate, lauryl ether sulfate and $C_{12}$-$C_{13}$ ethoxylated, 6.5 EO.

It will be seen that there is a window bounded by lower volume fraction of about 0.65 corresponding to the onset of instability and an upper volume fraction of 0.83 or 0.9 corresponding to a viscosity of 1 Pas or 2 Pas, respectively. This is only one such plot and in many cases the lower volume fraction can be 0.6 or slightly lower.

A complicating factor in the relationship between stability and viscosity on the one hand and, on the other, the volume fraction of the lamellar droplets is the degree of flocculation of the droplets. When flocculation occurs between the lamellar droplets at a given volume fraction, the viscosity of the corresponding product will increase owing to the formation of a network throughout the liquid. Flocculation may also lead to instability because deformation of the lamellar droplets, owing to flocculation, will make their packing more efficient. Consequently, more lamellar droplets will be required for stabilization by the space-filling mechanism, which will again lead to a further increase of the viscosity.

The volume fraction of droplets is increased by increasing the surfactant concentration and flocculation between the lamellar droplets occurs when a certain threshold value of the electrolyte concentration is crossed at a given level of surfactant (and fixed ratio between any different surfactant components). Thus, in practice, the effects referred to above mean that there is a limit to the amounts of surfactant and electrolyte which can be incorporated whilst still having an acceptable product. In principle, higher surfactant levels are required for increased detergency (cleaning performance). Increased electrolyte levels can also be used for better detergency, or are sometimes sought for secondary benefits such as building.

The dependency of stability and/or viscosity upon volume fraction can be favorably influenced by incorporating a deflocculating polymer comprising a hydrophilic backbone and one or more hydrophobic side chains. The use of such a polymer is taught in U.S. Pat. No. 5,147,576 to Montague et al., hereby incorporated by reference.

Another approach to viscosity control is to formulate the structured liquids to be shear thinning, i.e., accepting the high viscosity of the product at rest in a bottle but devising the composition such that the action of pouring causes shear beyond the yield point, so that the product then flows more easily. This property is utilized in the compositions described in our aforementioned specification EP-A-38,101. Unfortunately, it has been found that this cannot easily be utilized in liquids with high levels of active.

Yet another approach to controlling viscosity in aqueous structured liquids is use of viscosity reducing polymers such as taught in U.S. Pat. No. 5,108,644 to Machin et al. hereby incorporated by reference.

In none of these patents is it taught or suggested that viscosity control (as well as other benefits such as draining characteristics) can be controlled through process variables.

SUMMARY OF THE INVENTION

Unexpectedly, applicants have now found that process variables can affect viscosity and other characteristics. Specifically, applicants have found that the order of addition of a premix comprising a fluorescent dye (as well as a nonionic active and water) significantly affect the viscosity and the cleaning and pouring characteristics of the final composition.

More particularly, when the nonionic rich fluorescent dye (F-dye) premix is added to a main mix before the remaining actives (at least one nonionic and at least one anionic) are added to the main mix, the viscosity of the resulting composition is significantly reduced relative to when the F-dye premix is added after the actives.

More preferred embodiments are also defined depending on ratios of alkali metal hydroxide (e.g., sodium hydroxide to potassium hydroxide) or of monoethanolamine and triethanolamine used in the main mix.

DETAILED DESCRIPTION OF THE INVENTION

Figure 1:
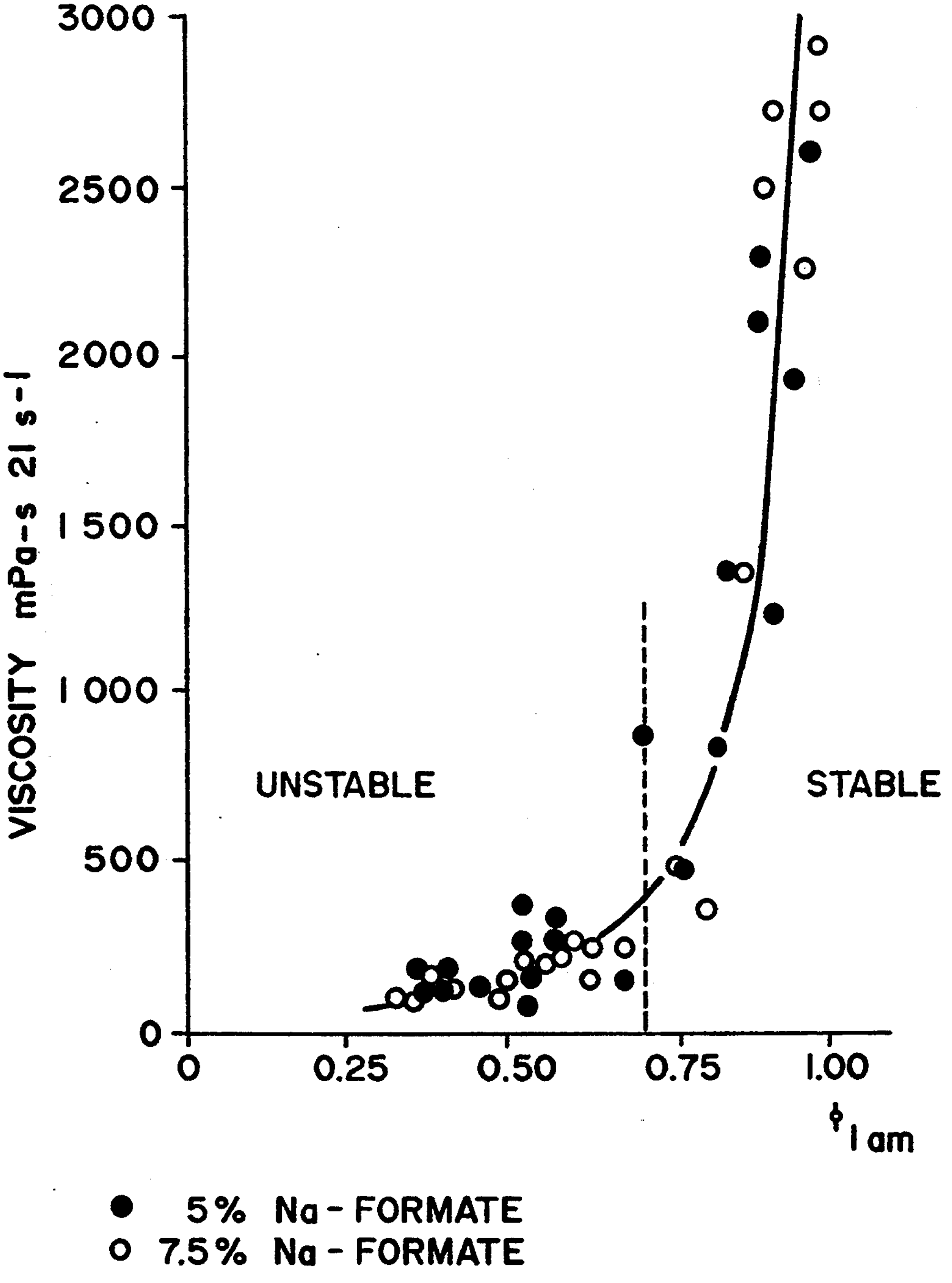
FIG. 1 shows a plot of viscosity against lamellar phase volume fraction for a typical composition of known kind.
Figure 2:
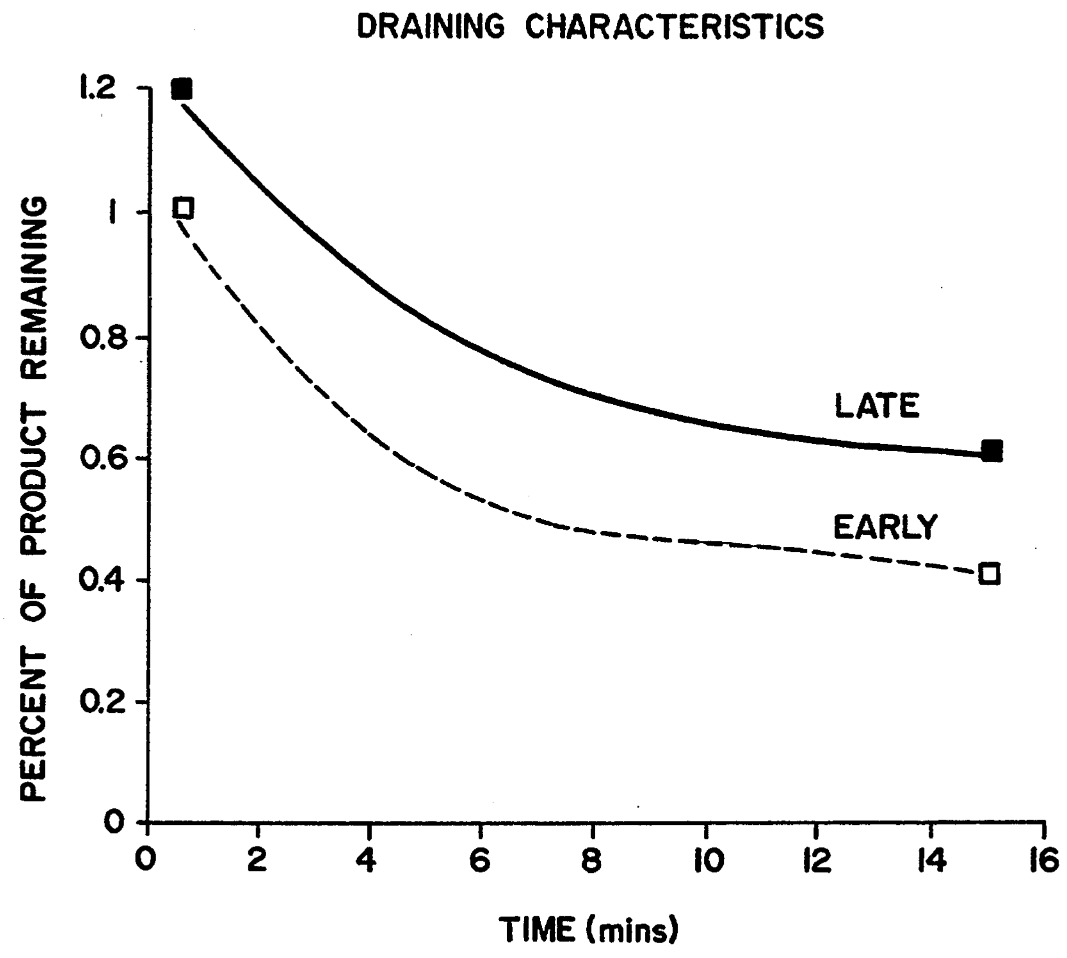
FIG. 2 shows differences in draining characteristics based on whether F-dye premix is added before addition of actives (early addition) or whether added later (late addition).

The present invention relates to structured, lamellar compositions.

Although it is possible to form lamellar dispersions of surfactant in water alone, in many cases it is preferred for the aqueous continuous phase to contain dissolved electrolyte. As used herein, the term electrolyte means any ionic water soluble material. However, in lamellar dispersions, not all the electrolyte is necessarily dissolved but may be suspended as particles of solid because the total electrolyte concentration of the liquid is higher than the solubility limit of the electrolyte. Mixtures of electrolytes also may be used, with one or more of the electrolytes being in the dissolved aqueous phase and one or more being substantially only in the suspended solid phase. Two or more electrolytes may also be distributed approximately proportionally, between these two phases. In part, this may depend on processing, e.g., the order of addition of components. On the other hand, the term 'salts' includes all organic and inorganic materials which may be included, other than surfactants and water, whether or not they are ionic, and this term encompasses the sub-set of the electrolytes (water soluble materials).

The only restriction on the total amount of detergent active material and electrolyte (if any) is that in the compositions of the invention, together they must result in formation of an aqueous lamellar dispersion. Thus, within the ambit of the present invention, a very wide variation in surfactant types and levels is possible. The selection of surfactant types and their proportions, in order to obtain a stable liquid with the required structure will be fully within the capability of those skilled in the art. However, it can be mentioned that an important sub-class of useful compositions is those where the detergent active material comprises blends of different surfactant types. Typical blends useful for fabric washing compositions include those where the primary surfactant(s) comprise nonionic and/or a non-alkoxylated anionic and/or an alkoxylated anionic surfactant.

In many (but not all) cases, the total detergent active material may be present at from 2% to 60% by weight of the total compositions, for example from 5% to 45% and typically from 20% to 40% by weight. However, one preferred class of compositions comprises at least 20%, most preferably at least 25%, and especially at least 30% of detergent active material based on the weight of the total composition.

In the case of blends of surfactants, the precise proportions of each component which will result in such stability and viscosity will depend on the type(s) and amount(s) of the electrolytes, as is the case with conventional structured liquids.

In the widest definition, the detergent active material in general may comprise one or more surfactants, and may be selected from anionic, cationic, nonionic, zwitterionic and amphoteric species, and (provided mutually compatible) mixtures thereof. For example, they may be chosen from any of the cases, sub-classes and specific materials described in 'Surface Active Agents' Vol. I, by Schwartz & Perry, Interscience 1949 and 'Surface Active Agents' Vol. II by Schwartz, Perry & Berch (Interscience 1958), in the current edition of "McCutcheon's Emulsifiers & Detergents" published by the McCutcheons Division of Manufacturing Confectioneries Company or in 'Tensid-Taschenbuch', H. Stache, 2nd Edn., Carl Hanser Verlag. Muchen & Wien, 1981.

Suitable nonionic surfactants include, in particular, the reaction products of compounds having a hydrophobic group and a reactive hydrogen atom, for example aliphatic alcohols acids, amides or alkyl phenols with alkylene oxides, especially ethylene oxide, either alone or with propylene oxide. Specific nonionic detergent compounds are alkyl ($C_6$–$C_{18}$) primary or secondary linear or branched alcohols with ethylene oxide and products made by condensation of ethyleneoxide with the reaction products of propylene oxide and ethylenediamine. Other so-called nonionic detergent compounds include long chain tertiary amine oxides, long-chain tertiary phosphine oxides and dialkyl sulphoxides.

Suitable anionic surfactants are usually water soluble alkali metal salts of organic sulphates and sulphonates having alkyl radicals containing from about 8 to about 22 carbon atoms, the term alkyl being used to include the alkyl portion of higher acyl radicals. Examples of suitable synthetic anionic detergent compounds are sodium and potassium alkyl sulphates, especially those obtained by sulphating higher ($C_8$–$C_{18}$) alcohols produced, for example, from tallow or coconut oil, sodium and potassium alkyl ($C_9$–$C_{20}$) benzene sulphonates, particularly sodium linear secondary alkyl ($C_{10}$–$C_{15}$) benzene sulphonates; sodium alkyl glyceryl ether sulphates, especially those ethers of the higher alcohols derived from tallow or coconut oil and synthetic alcohols derived from petroleum; sodium coconut oil fatty monoglyceride sulphates and sulphonates; sodium and potassium salts of sulfuric acid esters of higher ($C_8$–$C_{18}$) fatty alcohol-alkylene oxide, particularly ethylene oxide, reaction products; the reaction products of fatty acids such as coconut fatty acids esterified with isethionic acid and neutralized with sodium hydroxide; sodium and potassium salts of fatty acid amides of methyl taurine; alkane monosulphonates such as those derived by reacting alpha-olefins ($C_8$–$C_{20}$) with sodium bisulphite and those derived from reacting paraffins with $SO_2$ and $Cl_2$ and then hydrolyzing with a base to produce a random sulphonate; and olefin sulphonates, which term is used to describe the material made by reacting olefins, particularly $C_{10}$–$C_{20}$ alpha-olefins, with $SO_3$ and then neutralizing and hydrolyzing the reaction product. The preferred anionic detergent compounds are sodium ($C_{11}$–$C_{15}$) alkyl benzene sulphonates and sodium ($C_{16}$–$C_{18}$) alkyl sulphates.

Also possible is that part or all of the detergent active material is a stabilizing surfactant, which has an average alkyl chain length greater than 6 C-atoms, and which has a salting out resistance, greater than, or equal to 6.4. These stabilizing surfactants are disclosed in our copending European patent application 89200163.7. Examples of these materials are alkyl polyalkoxylated phosphates, alkyl polyalkoxylated sulphosuccinates; dialkyl diphenyloxide disulphonates; alkyl polysaccharides and mixtures thereof.

It is also possible, and sometimes preferred, to include an alkali metal soap of a long chain mono- or dicarboxylic acid for example one having from 12 to 18 carbon atoms. Typical acids of this kind are oleic acid, ricinoleic acid, and fatty acids derived from castor oil, rapeseed oil, groundnut oil, coconut oil, palmkernel oil or mixtures thereof. The sodium or potassium soaps of these acids can be used.

Preferably the amount of water in the composition is from 5 to 95%, more preferred from 25 to 75%, most preferred from 30 to 50%. Especially preferred less than 45% by weight.

The compositions optionally also contain electrolyte in an amount sufficient to bring about structuring of the detergent active material. Preferably through, the compositions contain from 1% to 60%, especially from 10 to 45% of a salting-out electrolyte. Salting-out electrolyte has the meaning ascribed to in specification EP-A-79,646. Optionally, some salting-in electrolyte (as defined in the latter specification) may also be included, provided if of a kind and in an amount compatible with the other components and the composition is still in accordance with the definition of the invention claimed herein. Some or all of the electrolyte (whether salting-in or salting-out), or any substantially water insoluble salt which may be present, may have detergency builder properties. In any event, it is preferred that compositions according to the present invention include detergency builder material, some or all of which may be electrolyte. The builder material is any capable of reducing the level of free calcium ions in the wash liquor and will preferably provide the composition with other beneficial properties such as the generation of an alkaline pH, the suspension of soil removed from the fabric and the dispersion of the fabric softening clay material.

Examples of phosphorous containing inorganic detergency builders, when present, include the water soluble salts, especially alkali metal pyrophosphates, orthophosphates, polyphosphates and phosphonates. Specific examples of inorganic phosphate builders include sodium and potassium tripolyphosphates, phosphates and hexametaphosphates. Phosphonate sequestrant builders may also be used.

Examples of non-phosphorous-containing inorganic detergency builders, when present, include water soluble alkali metal carbonates, bicarbonates, silicates and crystalline and amorphous aluminosilicates. Specific examples include sodium carbonate (with or without calcite seeds), potassium carbonate, sodium and potassium bicarbonates, silicates and zeolites.

In the context of inorganic builders, we prefer to include electrolytes which promote the solubility of other electrolytes, for example use of potassium salts to promote the solubility of sodium salts. Thereby, the amount of dissolved electrolyte can be increased considerably (crystal dissolution) as described in UK patent specification GB 1,302,543.

Examples of organic detergency builders, when present, include the alkaline metal, ammonium and substituted ammonium polyacetates, carboxylates, polycarboxylates, polyacetyl carboxylates, carboxymethyloxysuccinates, carboxymetholoxymalonates, ethylene diamine-N,N, disuccinic acid salts, polyepoxysuccinates, oxydiacetates, triethylene tetramine hexacetic acids salts, N-alkyl imino diacetates or dipropionates, alpha sulpho fatty acid salts, dipicolinic acid salts, oxidized polysaccharides, polyhydroxysulphonates and mixtures thereof.

Specific examples include sodium, potassium, lithium, ammonium and substituted ammonium salts of ethylene diaminetetraacetic acid, nitrilotriacetic acid, oxydisuccinic acid, melitic acid, benzene polycarboxylic acids and citric acid, tartrate mono succinate and tartrate disuccinate.

In the context of organic builders, it is also desirable to incorporate polymers which are only partly dissolved in the aqueous continuous phase. This allows a viscosity reduction (owing to the polymer which is dissolved) whilst incorporating a sufficiently high amount to achieve a secondary benefit, especially building, because the part which is not dissolved does not bring about the instability that would occur if substantially all were dissolved.

Examples of partly dissolved polymers include many of the polymer and copolymer salts already known as detergency builders. For example, may be used (including building and non-building polymers) polyethylene glycols, polyacrylates, polymaleates, polysugars, polysugarsulphonates and copolymers of any of these. Preferably, the partly dissolved polymer comprises a copolymer which includes an alkali metal salt of a polyacrylic, polymethacrylic or maleic acid or anhydride. Preferably, compositions with these copolymers have a pH of above 8.0. In general, the amount of viscosity-reducing polymer can vary widely according to the formulation of the rest of the composition. However, typical amounts are from 0.5 to 4.5% by weight.

It is further possible to include in the compositions of the present invention, alternatively, or in addition to the partly dissolved polymer, yet another polymer which is substantially totally soluble in the aqueous phase and has an electrolyte resistance of more than 5 grams sodium nitrilotriacetate in 100 ml of a 5% by weight aqueous solution of the polymer, said second polymer also having a vapor pressure in 20% aqueous solution, equal to or less than the vapor pressure of a reference 2% by weight or greater aqueous solution of polyethylene glycol having an average molecular weight of 6,000; said second polymer having a molecular weight of at least 1,000.

The incorporation of the soluble polymer permits formulation with improved stability at the same viscosity (relative to the composition without the soluble polymer) or lower viscosity with the same stability. The soluble polymer can also reduce viscosity drift, even when it also brings about a viscosity reduction. Here, improved stability and lower viscosity mean over and above any such effects brought about by the deflocculating polymer.

It is especially preferred to incorporate the soluble polymer with a partly dissolved polymer which has a large insoluble component. That is because although the building capacity of the partly dissolved polymer will be good (since relatively high quantities can be stably incorporated), the viscosity reduction will not be optimum (since little will be dissolved). Thus, the soluble polymer can usefully function to reduce the viscosity further, to an ideal level.

The soluble polymer can, for example, be incorporated at from 0.05 to 20% by weight, although usually, from 0.1 to 10% by weight of the total composition is sufficient, and especially from 0.2 to 4.5% by weight. It has been found that the presence of deflocculating polymer increase the tolerance for higher levels of soluble polymer without stability problems. A large number of different polymers may be used as such a soluble polymer, provided the electrolyte resistance and vapor pressure requirements are met. The former is measured as the amount of sodium nitrilotriacetate (NaNTA) solution necessary to reach the cloud point of 100 ml of a 5% solution of the polymer in water at 25° C., with the system adjusted to neutral pH, i.e., about 7. This is preferably effected using sodium hydroxide. Most preferably, the electrolyte resistance is 10 g NaNTA, especially 15 g. The latter indicates a vapor pressure low enough to have sufficient water binding capacity, as generally explained in the Applicants' specification GB-A-2,053,249. Preferably, the measurement is effected with a reference solution at 10% by weight aqueous concentration, especially 18%

Typical classes of polymers which may be used as the soluble polymer, provided they meet the above requirements, include polyethylene glycols, Dextran sulphonates, polyacrylates and polyacrylate/maleic acid copolymers.

The soluble polymer must have an average molecular weight of at least 1,000 but a minimum average molecular weight of 2,000 is preferred.

The use of partly soluble and the use of soluble polymers as referred to above in detergent compositions is described in our co-pending European patent applications EP 301,882 and EP 301,883.

Although it is possible to incorporate minor amounts of hydrotropes such as lower alcohols (e.g., ethanol) or alkanolamines (e.g., triethanolamine), in order to ensure integrity of the lamellar dispersion we prefer that the compositions of the present invention are substantially free from hydrotropes. By hydrotrope is meant any water soluble agent which tends to enhance the solubility of surfactants in aqueous solution.

A required ingredient in the compositions of the invention is the fluorescent dye (i.e., fluorescent whitening agent, FWA).

A fluorescent whitening agent (FWA) is defined by the American Society for Testing and Materials (ASTM) as a compound which, by its presence in or on a near-white substrate, creates a visual whitening effect by fluorescence. FWA have also been called white dyes, optical dyes, optical brighteners, optical bleaches, fluorescent dyes, fluorescent bleaching agents, fluorescent brighteners and brighteners.

When FWA are present on fabrics, they absorb invisible ultraviolet light which is present in daylight and many artificial light sources and emit longwave, visible bluish violet light. When FWA are applied to white fabrics which have acquired a yellowish cast, the blue-violet light emitted by the FWA provides a whiter appearance by additive mixture. This helps to restore the original whiteness of fabrics without the need for excessive use of bleaches which could damage fabrics.

FWA which are used in heavy-duty laundry detergents belong to several chemical classes, but all have certain features in common. These features include: (a) a conjugated, planar double bond system; (b) monomolecular distribution; (c) substantivity to fabrics; (d) the ability to absorb ultraviolet radiation between 300–400 nm (but not above 410 nm) and to emit visible blue light between 400 and 500 nm with maximal emission around 430–436 nm. In addition, FWA must meet other criteria, e.g., safety, stability, compatibility, solubility and cost.

The major class of FWA used in the U.S. in heavy-duty laundry detergents is the diaminostilbenedisulfonatecyanuric chloride derivatives (DAS/CC). Only the relatively stable, planar, trans-form of these FWA is substantive to fabrics and exhibits the desired fluorescence. The predominant group of DAS/CC derivatives used is the 4,4'-bis[(4-anilino-6-substituted-1,3,5-triazin-2yl)amino]stilbene-2,2'-disulfonic acids in which the substituted group is either morpholino, hydroxyethylmethylamino, dihydroxyethylamino, or methylamino. These derivatives differ, to varying degrees, in water solubility, reduction of effectiveness by nonionic surfactants, coloration of detergent powders and chlorine bleach stability. Some of these properties are influenced as much by the crystalline form of the FWA as they are by the nature of the substituted chemical group. The β-modification of the FWA crystals is manufactured by new technology resulting in a low-color product which is stable to storage. These crystals reduce problems of coloration of white detergent powders. Dust-free, free-flowing granules with good water solubility, produced by spray-drying, also have been developed.

Another major type of FWA is a naphthotriazolylstilbene whitener (NTS). One specific example used in heavy-duty laundry detergents is the sodium salt of 5-(2H-naphtho[1,2-d]triazol-2-yl)-2-(2-phenylethenyl)-benzene sulfonic acid.

A newer FWA which is in more limited use is a stilbene triazole FWA. One specific example used in heavy-duty laundry detergents is 4,4'-bis(4-phynel-1,2,3-triazol-2-yl)-stilbene-2,2'-disulfonic acid disodium salt.

Another major type of FWA used in heavy-duty laundry detergents is a distyrylbiphenyl (DSBP)-type. A specific example is 2,2-(4,4'-biphenylene divinylene)-dibenzenesulfonic acid, disodium salt.

Suppliers of FWA include Mobay Chemical Company (e.g., Blankophor brands); Ciba-Geigy (e.g. Tinopal brands) and GAF, among others.

Apart from the ingredients already mentioned, a number of optional ingredients may also be present, for example lather boosters such as alkanolamides, particularly the monoethanolamides derived from palm kernel fatty acids and coconut fatty acids, fabric softeners such as clays, amines and amine oxides, lather depressants, oxygen-releasing bleaching agents such as sodium perborate and sodium percarbonate, peracid bleach precursors, chlorine-releasing bleaching agents such as trichloroisocyanuric acid, inorganic salts such as sodium sulphate, and usually present in very minor amounts, perfumes, enzymes such as proteases, amylases and lipases (including Lipolase (Trademark) ex Novo), germicides and colorants.

The amounts of certain stability sensitive ingredients may depend on whether deflocculating polymers are used in the compositions.

Amongst these ingredients are agents to which lamellar dispersions, without deflocculating polymer, are highly stability-sensitive and, with deflocculating polymer present can be incorporated in higher, more useful amounts. These agents cause a problem in the absence of deflocculating polymer because they tend to promote flocculation of the lamellar droplets. Examples of such agents are soluble polymers, soluble builder such as succinate builders, fluorescers light Blankophor RKH, Tinopal LMS, and Tinopal DMS-X and Blankophor BBH as well as metal chelating agents, especially of the phosphonate type, for example the Dequest range sold by Monsanto.

Examples of compositions containing these ingredients in varying proportions are set forth in Examples 1a to 1f in U.S. Pat. No. 5,147,576 which has been incorporated herein by reference.

In particular, the present invention is directed to a process for reducing viscosity (as well as enhancing pouring and draining characteristics) even further in the compositions of the inventions utilizing process variables (e.g., order of addition).

More particularly, the above-identified compositions are generally prepared by mixing (1) salts and/or electrolytes (e.g., builders, alkali metal hydroxide); (2) actives (generally a blend of anionics and nonionics); (3) fluorescent dye (usually added in the form of a dye/-nonionic premix); and (4) amines (e.g., mono- and triethanolamine) and product signals such as perfume colors, enzymes and enzyme stabilizers.

As indicated above, generally the fluorescent dye used in the compositions is prepared in the form of a premix comprising the dye, a nonionic surfactant and water. The premix may also comprise an alkali imparting agent such as alkali metal hydroxide. When used, the alkali metal hydroxide functions to neutralize the F-dye and/or to increase the solubility of the F-dye.

This premix is generally added at some point during process preparation to a main mix comprising water, actives, salts and electrolytes (e.g., builders, acid neutralizers), and other optional ingredients recited above (e.g., deflocculating polymers, anti-foam agents, enzymes, enzyme stabilizers etc.). It should be noted that other components may also be added to the main mix in the form of different premixes.

Until now, there has been no knowledge that addition of the fluorescent dye premix (F-dye premix) at a particular point in the process has an effect one way or another.

Surprisingly and unexpectedly, it has now been found that if the F-dye premix comprising nonionic surfactant is added to the main mix before addition of the remaining actives or actives blend (which itself generally comprises a mixture of nonionics and anionics), viscosity is lowered and both pouring and draining characteristics are enhanced.

The premix comprises 1–20% of the total composition, preferably 2–10%.

As mentioned above, the premix comprises any fluorescent dye meeting the specifications defined above in a solution of about 0–70% water, preferably 20–40% water and 30% to about 100% nonionic surfactant, preferably 50–90% nonionic surfactant. The nonionic surfactant may be any of the surfactants discussed above. The premix may contain a small amount, i.e., about 0.05–5%, preferably 0.1–4% of an alkali metal hydroxide which will help neutralize the generally acid fluorescent dye and/or to help solubilize the F-dye.

In a specific embodiment of the invention this premix is added to a main mix comprising about 5–20% water, about 5–40%, preferably about 5%–30% builder, 0–20%, preferably 2%–10% enzyme stabilizer (e.g., combination of glycerol and borax, e.g., about 2–10% glycerol and about 1–5% borax), and about 2–10% alkali metal hydroxide. All percentages are percentages of the final composition.

Only after the premix is added to the main mix are additional components added. These would include the addition of the remaining actives. Generally, the active mixture is a blend of nonionic and anionic surfactants in which the anionic comprises about 20–40% of the final composition and nonionic comprises about 5–70% of the final composition.

Other components which may be subsequently added include a buffer system (e.g., monoethanolamine/triethanolamine) comprising about 2–10% of the final composition, dyes additional enzyme stabilizer (i.e., calcium ions), perfume and enzyme.

According to the invention, it has been found that if the F-dye premix is added before the additional actives, viscosity, pouring and draining characteristics are superior to when the premix is added after the active blend. This is described in greater detail in the examples which follow.

In addition, it has also been discovered that ratios of sodium hydroxide to potassium hydroxide and of monoethanolamine to triethanolamine added to the main mix may also impact on viscosity characteristics.

In general, increasing ratios of potassium hydroxide to sodium hydroxide seems to lower viscosity; while lower viscosity seems best obtained when ratios of monoethanolamine to triethanolamine are between about 6:4 and 4:6, preferably 1:1.

The examples below are intended to illustrate the invention and are not intended to be limiting in any way.

EXAMPLE 1

The table below indicates differences in product's viscosity upon completion of the batch based on whether the F-dye premix is added before addition of the active blend of the invention or whether the F-dye premix is added after addition of the active blend.

| F-DYE ADDITION | NaOH/KOH | | MEA/TEA | | VISCOSITY (measured as mPas at $21^{-1}$) |
|---|---|---|---|---|---|
| Before Actives | 100% | 0% | 50% | 50% | 775 |
| After Actives | 100% | 0% | 50% | 50% | 1160 |
| Before Actives | 100% | 0% | 75% | 25% | 526 |
| After Actives | 100% | 0% | 75% | 25% | 1180 |
| Before Actives | 75% | 25% | 50% | 50% | 447 |
| After Actives | 75% | 25% | 50% | 50% | 1150 |
| Before Actives | 75% | 25% | 75% | 25% | 451 |
| After Actives | 75% | 25% | 75% | 25% | 447 |
| Before Actives | 75% | 25% | 100% | 0% | 537 |
| After Actives | 75% | 25% | 100% | 0% | 776 |

-continued

| F-DYE ADDITION | NaOH/KOH | | MEA/TEA | | VISCOSITY (measured as mPas at $21^{-1}$) |
|---|---|---|---|---|---|
| Before Actives | 50% | 50% | 75% | 25% | 503 |
| After Actives | 50% | 50% | 75% | 25% | 597 |
| Before Actives | 50% | 50% | 100% | 0% | 461 |
| After Actives | 50% | 50% | 100% | 0% | 573 |

As can be seen from the table, when the F-dye premix is added before addition of the actives blend, the viscosity of final composition is lower than if it is added after addition of the actives in almost every case.

As also seen from the table other factors which may affect viscosity of the composition are the ratio of NaOH to KOH and of monoethanolamine to triethanolamine in the main mix.

Generally, as the ratio of KOH to NaOH increases above 1:1, this results in lowered viscosity of the final composition.

With regard to the ratio of MEA/TEA, viscosity appears to be lowered as the ratio of MEA/TEA approaches 1:1 (from a point higher than 1:1) although the ratio of NaOH to KOH seems to have some effect on the pattern.

I claim:

1. A process for reducing the viscosity and improving draining characteristics of a structured lamellar composition comprising (a) a main mix comprising about 5-20% water, about 5-40% builder, 0-20% enzyme stabilizer, about 2-10% alkali metal hydroxide and about 2-10% buffer system comprising monoethanolamine and triethanolamine, all percentages being by weight of the final composition (b) at least a nonionic surfactant and one or more surfactants selected from the group consisting of an ionic surfactants, cationic surfactants, zwitterionic surfactants, and amphoteric surfactants; and (c) a fluorescent dye; which process comprises adding to a main mix a 1-20% by weight of a premix comprising the fluorescent dye and 20-70% by weight of the total nonionic surfactant in the final composition before addition of the remaining surfactant (b) to said main mix;

said premix comprising, in addition to fluorescent dye, about 0-70% by weight water and about 30-100% by weight nonionic surfactants.

2. A process according to claim 1, wherein the premix additionally comprises alkali metal hydroxide.

3. A process according to claim 1 wherein the premix additionally comprises about 0.5 to 5% by wt. of the premix alkali metal hydroxide.

4. A process according to claim 1, wherein the remaining surfactant added is a blend of anionic and nonionic surfactant.

5. A process according to claim 4, wherein the blend comprises about 20-40% anionic and about 5-20% nonionic, as measured by weight according to the final composition.

* * * * *